Patented June 21, 1927.

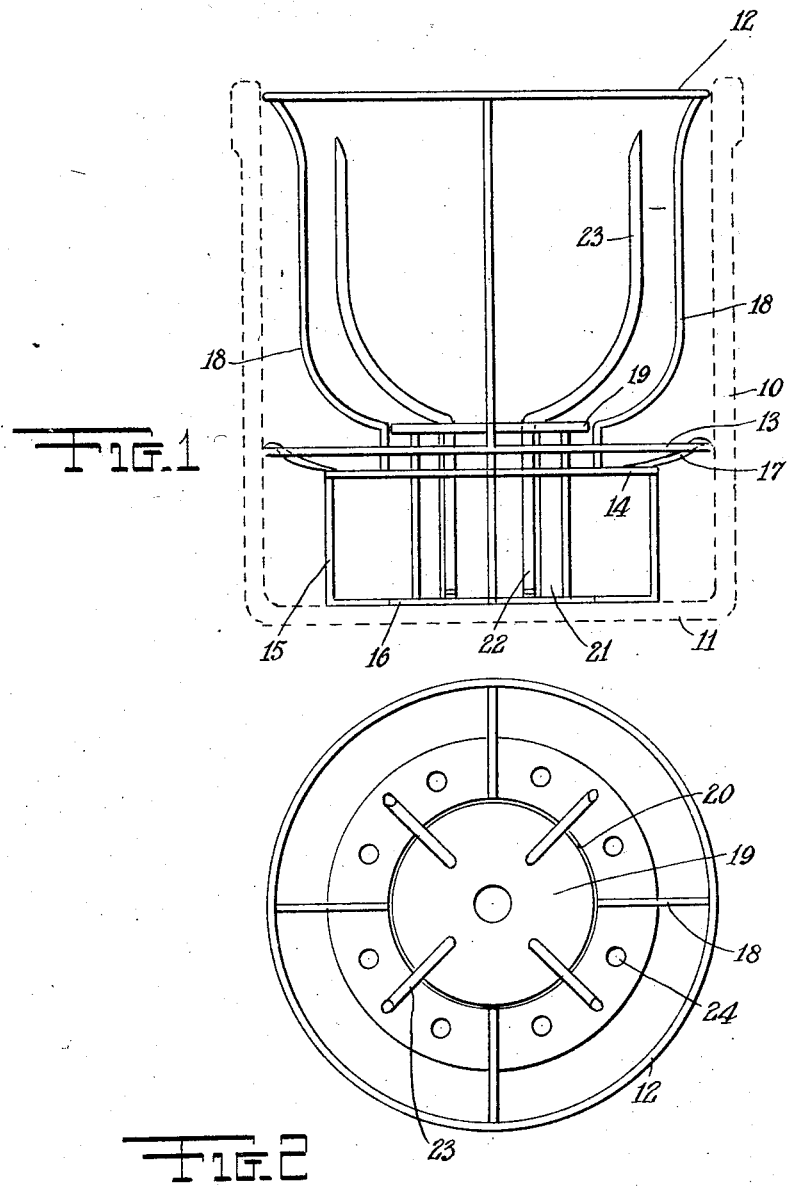

1,633,184

UNITED STATES PATENT OFFICE.

FRANK LUIPERSBEK, OF BOUNDBROOK, NEW JERSEY.

MOISTURE FEEDER FOR FLOWERPOTS.

Application filed October 23, 1926. Serial No. 143,590.

The main object of this invention is to provide a cage insertable into a flower pot for the purpose of retaining the soil in which a plant grows above a pocket in the lower end of the flower pot, which pocket is filled with water.

Another object is to provide a cage for supporting soil in the upper half of a flower pot beneath which a pocket exists for water, the latter being absorbed by the soil as required thru means of feeder forks forming a part of the invention.

The above and other objects will become apparent in the description below, in which characters of reference refer to like-named parts in the drawing.

Referring briefly to the drawing, Figure 1 is a side elevational view of the soil cage and water feeder device, showing the same in a flower pot, which latter is illustrated by broken lines.

Figure 2 is a top plan view of Figure 1.

Referring in detail to the drawing, the numeral 10 indicates the encircling wall of a flower pot which is closed at its lower end by a bottom 11. The device of this application is adapted to be inserted into the flower pot for the purpose of positioning the soil above the lower end of the pot so that a water pocket will exist at the lower concealed end. The device consists of a cage which is provided with an upper circular ring 12 and a lower circular ring 13, both rings being of the same dimensions, one being above the other. An annular platform 14, smaller in diameter than either of the rings 12 or 13 is supported on legs 15 which latter extend downwardly and are bent at right angles at their lower ends and are joined to a base plate 16 which lies upon the surface of the bottom 11 of the flower pot. The platform 14 has perforations 24 and serves as a seat for the soil which is retained within the flower pot. The lower ring 13 is retained in its position by a plurality of arms 17 which extend outwardly from the edge of the soil plate 14 and are integral therewith. A plurality of uprights 18 extend vertically in curved outline from the soil plate 14 and the upper ends are joined to a ring 12 fixing the latter in position at the upper end of the flower pot. A second and separate seat 19 passes thru an axial opening 20 in the soil plate 14 and is mounted above the latter.
This seat is formed of brick of porous texture and is supported upon vertical and integral legs 21, arranged concentrically the lower ends of which are seated upon the base plate 16. This second seat is provided with openings thru which the straight ends 22 of outwardly curved prongs 23 pass. The prongs extend upwardly and are curved outwardly from the openings in the second seat, the distance between the opposing prongs 23 being lesser than the distance between the opposing uprights 18, as illustrated in Figure 1. These prongs are formed of some such material as compressed sponge which has been impregnated with fertilizer powder so that the curved upper ends of these prongs will absorb the water from the pocket formed below the soil plate 14 and transfer this absorbed water to the upper end of the prongs and at the same time furnish nourishment to the soil which is encased in the flower pot.

This device is adapted to retain a quantity of soil in the upper portion of a flower pot so that a pocket exists at the lower end of the flower pot in which water may be retained. The water is absorbed by the porous prongs 23 whose lower ends 22 are submerged within the water, it being noted that the flower pot is at all times filled with water to a position level with the soil plate 14. The water feeding apparatus consisting of the second seat 19, the legs 21, and the prongs 23, is readily removable from the cage and may be replaced at will. The soil is filled into the cage and is supported upon the plate 14 above the water pocket in the flower pot. This soil has its upper level aligned with the ring 12 a short distance below the rim or upper edge of the flower pot 10. The water for the plant is poured into the upper end of the flower pot and seeps thru the soil, dripping into that portion of the flower pot below the soil plate 14. It is well known that as water is quickly poured upon a plant, the latter has not the capacity of quickly absorbing and using this water, and the greater portion thereof flows away unused. By providing this device within the flower pot, this water which would ordinarily not be used, is used slowly and when it is required. The prongs 23 are formed of some compressed sponge material and impregnated with fertilizer material so that the soil within the flower pot will receive nourishment and not become impoverished and at the same time receive water which is also necessary for the growth of the plant.

It is to be noted that certain changes in form and construction may be made without departing from the spirit and scope of the invention.

I claim:—

1. In combination with a flower pot, a cage serving for retaining soil, a raised seat supporting said soil above the bottom of said flower pot, legs supporting said seat, said flower pot being adapted to be filled with water to the level of said seat, a second seat raised above the first-named seat, legs supporting said second-named seat, prongs extending from said second named seat upwardly and downwardly, said prongs absorbing water from beneath said first-named seat, the prongs passing thru said second seat to a position below said first-named seat.

2. In combination with a flower pot, a cage serving for retaining soil, a raised seat supporting said soil above the bottom of said flower pot, legs supporting said seat, said flower pot being adapted to be filled with water to the level of said seat, a second seat raised above the first-named seat, legs supporting said second-named seat, prongs extending from said second-named seat upwardly and downwardly, said prongs absorbing water from beneath said first-named seat, the prongs passing thru said second seat to a position below said first-named seat, said prongs being curved outwardly above said second-named seat, the prongs being formed of an absorbent material impregnated with a soil nourishing material.

In testimony whereof I affix my signature.

FRANK LUIPERSBEK.